(12) United States Patent
Ueyama

(10) Patent No.: US 7,362,352 B2
(45) Date of Patent: Apr. 22, 2008

(54) IMAGE CAPTURING APPARATUS WITH VARIABLE COMMUNICATION FORMS

(75) Inventor: Masayuki Ueyama, Osaka (JP)

(73) Assignee: Minolta Co., Ltd., Osaka (JP)

( * ) Notice: Subject to any disclaimer, the term of this patent is extended or adjusted under 35 U.S.C. 154(b) by 564 days.

(21) Appl. No.: 10/157,060

(22) Filed: May 29, 2002

(65) Prior Publication Data

US 2002/0191081 A1 Dec. 19, 2002

(30) Foreign Application Priority Data

May 30, 2001 (JP) ............................. 2001-162773

(51) Int. Cl.
*H04N 5/225* (2006.01)
(52) U.S. Cl. ................. 348/207.1; 348/211.1
(58) Field of Classification Search ............ 348/207.1, 348/207.11, 211.99, 211.1, 211.9, 211.2, 348/211.3, 211.4, 211.6, 211.8, 211.12, 211.14, 348/211.13, 211.11, 211.7, 211.04, 211.5; 705/80, 77, 26
See application file for complete search history.

(56) References Cited

U.S. PATENT DOCUMENTS

| 2,003 | A | * | 3/1841 | Osdel ........................ 416/17 |
| 5,640,202 | A | * | 6/1997 | Kondo et al. ............ 348/222.1 |
| 5,838,368 | A | * | 11/1998 | Masunaga et al. ....... 348/211.9 |
| 6,043,837 | A | * | 3/2000 | Driscoll et al. ............... 348/36 |
| 6,259,469 | B1 | * | 7/2001 | Ejima et al. ............ 348/14.01 |
| 6,377,989 | B1 | * | 4/2002 | Fukasawa et al. .......... 709/224 |
| RE38,198 | E | * | 7/2003 | Orii .......................... 386/118 |
| 6,642,958 | B2 | * | 11/2003 | Watanabe et al. ........... 348/552 |
| 6,750,902 | B1 | * | 6/2004 | Steinberg et al. ........ 348/211.3 |
| 6,819,355 | B1 | * | 11/2004 | Niikawa ................ 348/207.11 |
| 6,856,815 | B2 | * | 2/2005 | Kuba ........................ 455/557 |
| 6,870,566 | B1 | * | 3/2005 | Koide et al. ................ 348/296 |
| 6,882,361 | B1 | * | 4/2005 | Gaylord ................... 348/207.1 |
| 7,027,084 | B1 | * | 4/2006 | Watanabe ................ 348/211.2 |
| 2002/0041326 | A1 | * | 4/2002 | Driscoll et al. ............... 348/36 |
| 2002/0051074 | A1 | * | 5/2002 | Kawaoka et al. ........... 348/376 |

(Continued)

FOREIGN PATENT DOCUMENTS

EP 944247 A2 * 9/1999

(Continued)

*Primary Examiner*—Tuan Ho
*Assistant Examiner*—Nelson D. Hernández
(74) *Attorney, Agent, or Firm*—Sidley Austin LLP

(57) ABSTRACT

In an image capturing apparatus which can be remotely operated from an operation terminal, to carry out image transmission control in accordance a communication form between the image capturing apparatus and the operation terminal. An image capturing apparatus 2 has a judging section 244, and judges a communication form between an operation terminal with which the image capturing apparatus 2 communicates. The transmission control section 243 carries out a control regarding transmission of an image based on a result of judgment by the judging section 244. When the current communication form is judged as low-speed communication from the result of judgment, the transmission control section 244 performs a process such as decreasing the operation speed of panning, tilting and zooming of the image taking section 21 or decreasing the resolution of an image to be transmitted. When the current communication form is judged as being of an amount-dependent charge system from the result of judgment, a process such as decreasing the frame rate of image transmission or increasing the compression rate of image is performed.

4 Claims, 12 Drawing Sheets

| | | NORMAL CAMERA MODE | DIRECT REMOTE CONTROL MODE | INTERNET MODE | TELEPHONE LINE MODE |
|---|---|---|---|---|---|
| DELAY MEASURE | SPEED RESTRICTION | NO | NO | YES | NO |
| | IMAGE BUFFER | NO | NO | YES(1sec) | NO |
| | IMAGE BUFFER RATE | — | — | 10fps | — |
| PACKET SAVING | TRANSFER IMAGE FORMAT | — | QCIF | QCIF | QCIF |
| | FRAME RATE | — | 15fps | 10fps | 5fps |
| | COMPRESSION RATE | — | 1/10 | 1/20 | 1/40 |
| OTHERS | MAIN UNIT LCD DISPLAY | ON OR OFF (BY CAMERA OPERATION) | OFF | OFF | OFF |

U.S. PATENT DOCUMENTS

| | | |
|---|---|---|
| 2002/0191080 A1* | 12/2002 | Terada et al. ............. 348/207.1 |
| 2003/0011680 A1* | 1/2003 | Tanaka et al. ............ 348/207.1 |
| 2003/0025808 A1* | 2/2003 | Parulski et al. ......... 348/231.99 |
| 2003/0160869 A1* | 8/2003 | Koyama ................... 348/207.1 |
| 2003/0189636 A1* | 10/2003 | Ejima et al. ............. 348/14.01 |

FOREIGN PATENT DOCUMENTS

| | | | |
|---|---|---|---|
| JP | 11266383 A | * | 9/1999 |
| JP | 2001-028740 A | | 1/2001 |

* cited by examiner

F I G. 2 A
F I G. 2 B
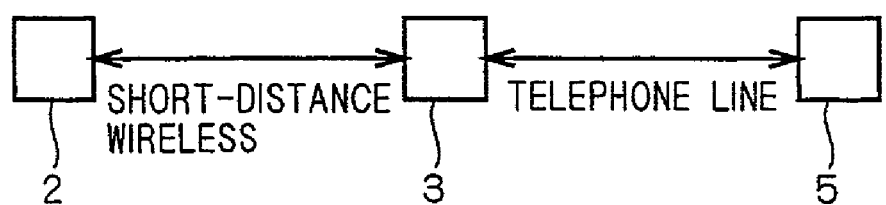
F I G. 2 C
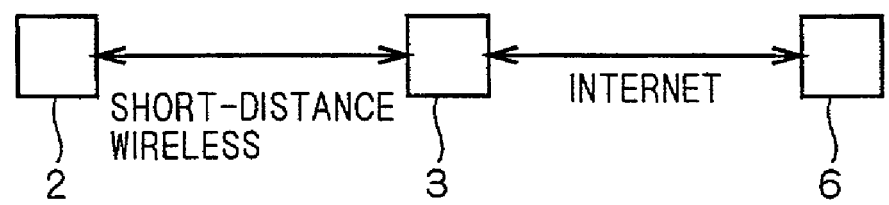

| | DEVICE ADDRESS | IP ADDRESS | USE TELEPHONE LINE? |
|---|---|---|---|
| HOME CONTROLLER | a1 | a1.bbb.ccc.ddd | — |
| PORTABLE INFORMATION TERMINAL | a2 | a2.bbb.ccc.ddd | YES |
| REMOTE CONTROLLER | a3 | a3.bbb.ccc.ddd | NO |
| PERSONAL COMPUTER | — | a4.bbb.ccc.ddd | NO |
| . | . | . | . |
| . | . | . | . |

| | | NORMAL CAMERA MODE | DIRECT REMOTE CONTROL MODE | INTERNET MODE | TELEPHONE LINE MODE |
|---|---|---|---|---|---|
| DELAY MEASURE | SPEED RESTRICTION | NO | NO | YES | NO |
| | IMAGE BUFFER | NO | NO | YES (1sec) | NO |
| | IMAGE BUFFER RATE | — | — | 10fps | — |
| PACKET SAVING | TRANSFER IMAGE FORMAT | — | QCIF | QCIF | QCIF |
| | FRAME RATE | — | 15fps | 10fps | 5fps |
| | COMPRESSION RATE | — | 1/10 | 1/20 | 1/40 |
| OTHERS | MAIN UNIT LCD DISPLAY | ON OR OFF (BY CAMERA OPERATION) | OFF | OFF | OFF |

| | DEVICE ADDRESS | IP ADDRESS |
|---|---|---|
| HOME CONTROLLER | a1 | a1.bbb.ccc.ddd |
| PORTABLE INFORMATION TERMINAL | a2 | a2.bbb.ccc.ddd |
| REMOTE CONTROLLER | a3 | a3.bbb.ccc.ddd |
| PERSONAL COMPUTER | — | a4.bbb.ccc.ddd |
| • | • | • |
| • | • | • |

FIG. 14

| | SHORT-DISTANCE COMMUNICATION (DIRECT REMOTE CONTROL MODE) | LONG-DISTANCE COMMUNICATION (INTERNET, TELEPHONE LINE) |
|---|---|---|
| WARNING SOUND | ON | OFF |
| HIGH-FINENESS IMAGE RECORDING | RECORDED AT IMAGE CAPTURING APPARATUS, NOT TRANSMITTED TO OPERATION TERMINAL | NOT RECORDED AT IMAGE CAPTURING APPARATUS, TRANSMITTED TO OPERATION TERMINAL AND RECORDED AT OPERATION TERMINAL |

IMAGE CAPTURING APPARATUS WITH VARIABLE COMMUNICATION FORMS

This application is based on application No. 2001-162773 filed in Japan, the contents of which are hereby incorporated by reference.

BACKGROUND OF THE INVENTION

1. Field of the Invention

The present invention relates to a configuration of an image capturing apparatus which is able to transmit an image, and a configuration of an image capturing system including such an image capturing apparatus.

2. Description of the Background Art

There has been an image capturing apparatus which captures an image and transmits the captured image to an operation terminal at remote site. The operation terminal is provided with a monitor which allows display of the captured image thus received. Further, in response to operations made with buttons by an operator, the operation terminal transmits to the image capturing apparatus, for example, commands regarding operations such as panning, tilting or zooming of the camera and a release command for instructing image recording.

With the use of a system comprising such an image capturing apparatus and an operation terminal, an operator can look images captured by the image capturing apparatus even at a site remote from the image capturing apparatus. Furthermore, by remote operation, the operator can record required images while controlling an angle of visibility in desired manners. In other words, it becomes possible to take an image of an object existing at a remote site in desired timing by utilizing the monitor of the operation terminal as a view finder.

In such an image capturing system, various kinds of communication forms between the image capturing apparatus and the operation terminal are available. Between the image capturing apparatus and the operation terminal, wireless communications such as bluetooth™, as well as wired communications via a telephone line, the Internet and the like are available. Also these communication forms can be used in combination.

However, when the image capturing apparatus and the operation terminal employs different communication forms, a difference occurs in the time when an image transmitted from the image capturing apparatus reaches the operation terminal.

In the case where the image capturing apparatus and the operation terminal communicate only by way of short-distance wireless communication, a transmission delay time will not be so long, however, in the case where the communication form between the image capturing apparatus and the operation terminal includes the Internet, a transmission delay time will be long.

In the case where the transmission delay time is long, the image that the operator is looking on the monitor of the operation terminal differs from the image that the image capturing apparatus is capturing now. For this reason, a desired captured image will not be obtained even if the operator paces the timing of image capturing while looking at the monitor and transmits a release command by remote control.

For solving these problems, several measures (transmission delay measures) have been taken heretofore, however, in the situation that the communication form with respect to the operation terminal is not fixed, there are no means for addressing the above problems.

Furthermore, in the case where the communication form between the image capturing apparatus and the operation terminal is the form where the charge depends on the amount of data transmission, since the communication cost differs depending on the frame rate of image transmission from the image capturing apparatus, a problem in cost arises in the system which transmits images at a constant frame rate regardless of communication form.

SUMMARY OF THE INVENTION

The present invention is directed to an image capturing apparatus which captures an image of a subject by an image taking section.

In accordance with a first aspect of the present invention, an image capturing apparatus includes a transmission section for transmitting data of a captured image to an operation terminal via a communication line including at least a public line, a judging section for judging a current communication form with the operation terminal, and a controller for controlling operation of the image capturing apparatus based on a result of judgment by the judging section.

Therefore, in this image capturing apparatus, since the current communication form is judged by the judging section, and control of the image capturing apparatus is carried out in accordance with the result of judgment, it is possible to carry out a process in accordance with the communication form. Therefore, it is possible to provide an image capturing apparatus which is excellent in operability.

In accordance with other aspect of the present invention, an image capturing apparatus includes a communication section which is able to transmit a captured image to a plurality of operation terminals and is able to receive an operation command from the plurality of operation terminals, a judging section, when receiving the operation command via the communication section, for judging a communication form with an operation terminal that issued that operation command, and a controller for controlling operation of the image capturing apparatus based on a result of judgment by the judging section.

Therefore, in this image capturing apparatus, since the judging section judges the communication form with the operation terminal that has issued the operation command, and the control of the image capturing apparatus is carried out in accordance with the result of judgment, it is possible to achieve a process in accordance with the communication form with each operation terminal. Accordingly, it is possible to provide an image capturing apparatus which is excellent in operability.

Also, the present invention is directed to an image capturing system for capturing an image by remote operation.

According to one aspect of the present invention, an image capturing system includes an image capturing apparatus for capturing an image, and an operation terminal for remotely operating the image capturing apparatus, the operation terminal including a first transmitting section for transmitting an image recording command to the image capturing apparatus, and a display section for performing image display based on image data received from the image capturing apparatus, the image capturing apparatus including a second transmitting section for transmitting data of a captured image to the operation terminal, a judging section for judging a current communication form with the operation terminal, a controller for controlling operation of the image capturing apparatus based on a result of judgment by the judging section, and an image memory for storing the image data by receiving a recording command from the operation terminal.

Therefore, in this image capturing system, a process is carried out in accordance with the communication path between the image capturing apparatus and the operation terminal, so that a desired image can be acquired also by remote operation.

As described above, the present invention is devised to solve the conventional problems, and an object of the present invention is to achieve image transmission control in accordance with the communication form between the image capturing apparatus and the operation terminal.

In addition, short-distance wireless communications are often used in the situation that the operator is close enough to the image capturing apparatus to directly operate the same, whereas communications utilizing telephone lines or the Internet are often used in the situation that the operator is at a space where direct operation of the image capturing apparatus is not enabled such as on the road. It is also an object of the present invention to suggest a suitable control of image capturing apparatus corresponding to such a difference in situation.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2C are views each showing patterns of communication form between each apparatus.

FIG. 9 is a view showing contents of an address table.

FIG. 11 is a view showing contents of a mode setting table in which setting information for each communication mode is recorded.

FIG. 12 is a view showing contents of an address table in a modified embodiment.

FIG. 14 is a view showing a modified example of a control method in accordance with communication mode.

DETAILED DESCRIPTION OF THE INVENTION

In the following, embodiments of the present invention will be explained with reference to the drawings.

<1. General Configuration of System>

Figure 1:
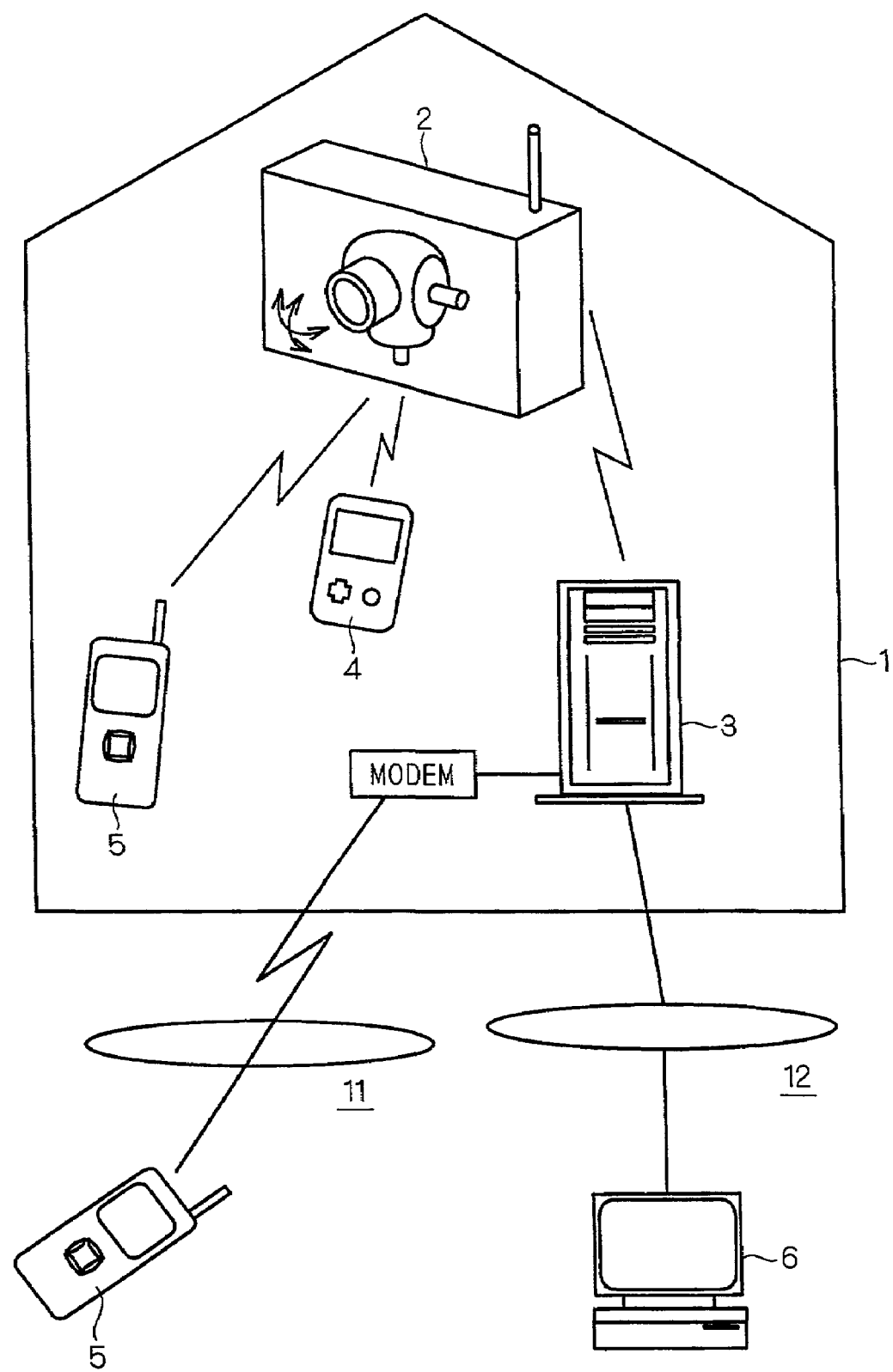
FIG. 1 shows a general image of an image capturing system.

FIG. 1 shows an image of the entire system of an image capturing system according to the present embodiment. An image capturing apparatus 2 provided in an institution 1 is an image capturing apparatus which can be remotely operated and is able to transmit captured image data to each operation terminal. An operation terminal is a terminal which remotely operates the image capturing apparatus 2 and is able to output an image received from the image capturing apparatus 2 on a monitor, and as such an operation terminal, a remote controller 4, a portable information terminal 5, a PC (personal computer) 6 and the like are used. In the following explanation, the remote controller 4, the portable information terminal 5 and the PC 6 are generically called an operation terminal.

An image captured at the image capturing apparatus 2 will be transmitted to the operation terminal at a predetermined frame rate. Therefore, at the operation terminal, it is possible to check a real-time image being captured at the image capturing apparatus 2 by using the monitor provided in the operation terminal as a view finder.

The image capturing apparatus 2 also enables operations such as panning, tilting and zooming of the camera, and an angle of visibility or magnification of a subject can be changed in a desirable manner by remote operation from the operation terminal.

Among the operation terminals, the remote controller 4 and the portable information terminal 5 can communicate with the image capturing apparatus 2 using a short-distance wireless communication. The short-distance wireless communication may use a standardized protocol such as bluetooth™. Alternatively, a special protocol may be used for the wireless communication.

The institution 1 also has therein a home controller 3. The home controller 3 may be configured by a general-purpose PC to which, for example, special software and hardware are added, or may be configured by a special terminal.

Also the home controller 3 can communicate with the image capturing apparatus 2 using a short-distance wireless communication. The home controller 3 can communicate with the portable information terminal 5 via a telephone line 11. As a result of this, using the telephone line 11 and the wireless communication, the portable information terminal 5 can communicate with the image capturing apparatus 2 even from outside the institution 1. In other words, the portable information terminal 5 can remotely operate the image capturing apparatus 2 in direct by using the wireless communication when it is in the institution 1, or using the telephone line 11 and the wireless communication when it is outside the institution 1.

Further, the PC 6 and the home controller 3 can communicate via the Internet 12. As a result, the PC 6 can communicate with the image capturing apparatus 2 even from outside the institution 1 by using the Internet 12 and the wireless a communication.

With such a configuration, a user of this image capturing system in the institution 1 can remotely operate the image capturing apparatus 2 by utilizing the wireless communication, as well as check an image captured at the image capturing apparatus 2 on the monitor. On the other hand, from outside the institution 1, the user can remotely operate the image capturing apparatus 2 by utilizing the wireless communication in combination with other communication forms.

FIGS. 2A to 2C are views showing communication forms between the image capturing apparatus 2 and different operation terminals. FIG. 2A is a view showing the state that the image capturing apparatus 2 communicates with the operation terminals (remote controller 4, portable information terminal 5) via wireless communication. FIG. 2B is a view showing the state that the image capturing apparatus 2 communicates with the portable information terminal 5 utilizing the telephone line 11 and the wireless communication. FIG. 2C is a view showing the state that the image capturing apparatus 2 communicates with the PC 6 utilizing the Internet 12 and the wireless communication.

It is to be understood that the institution 1 may be any place without being particularly limited. For example, when the institution 1 is an ordinary home, the system can be used for seeing the condition of a pet at home from on the road by means of the portable information terminal 5. Also, the system may be used as a monitoring camera in a home while members in the home are away. Though the explanation is made by using the name "institution 1", the place where the image capturing apparatus 2 is installed may be outdoors. The system may be used for observing small animals outdoors by remote operation.

<2. Configuration of Image Capturing Apparatus>

Figure 3:
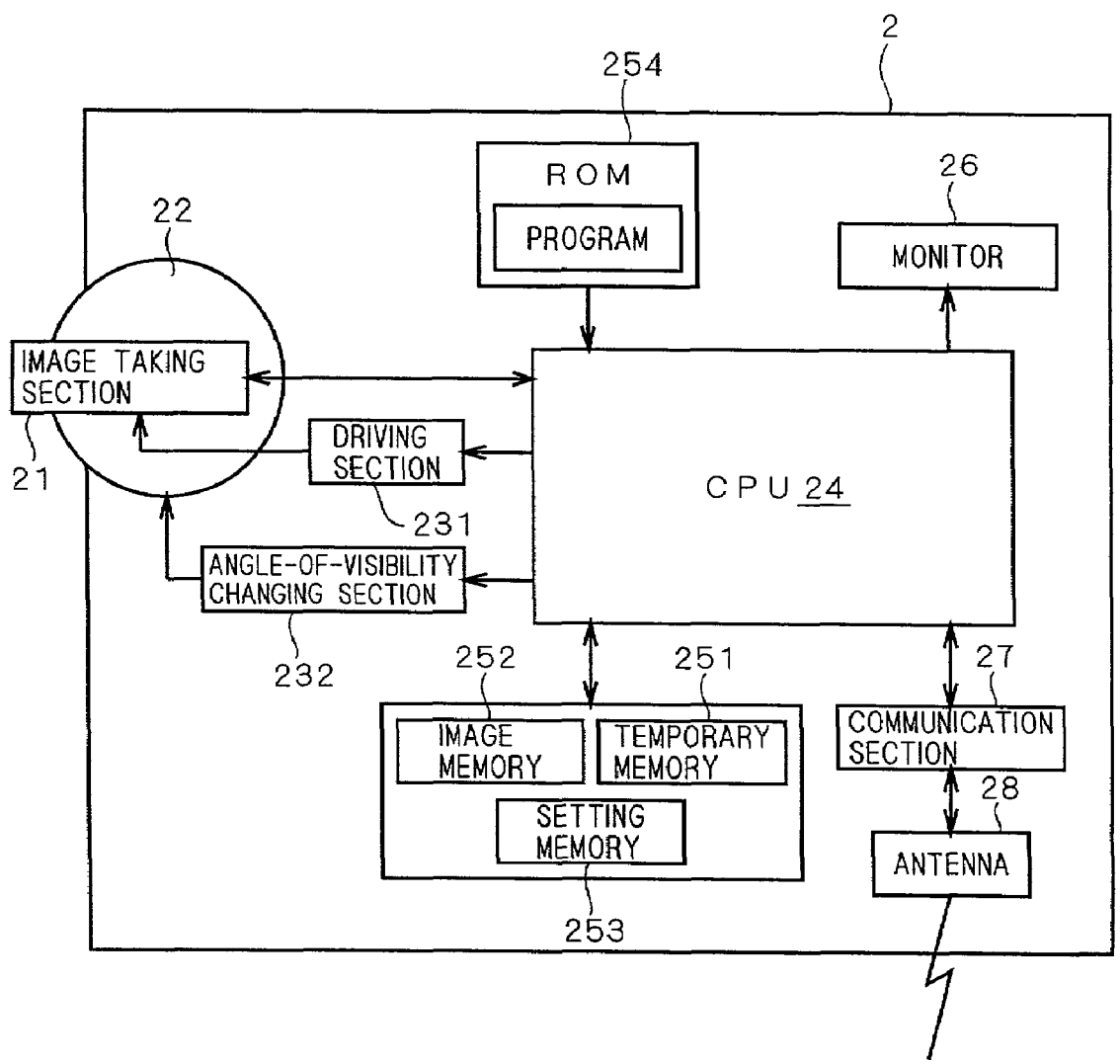
FIG. 3 is a block configuration view of the image capturing apparatus.

Next, an internal configuration of the image capturing apparatus 2 will be explained with reference to FIG. 3.

The image capturing apparatus 2 includes an image taking section 21 structured by a CCD, a zoom lens, a focus lens and the like. A driving section 231 for driving these zoom lens and the focus lens is connected to the image taking section 21, and the driving section 231 drives each lens under the control of a CPU 24 to enable a zoom operation and a focus operation.

The image taking section 21 is accommodated in a spherical unit 22. The unit 22 is supported so as to be rotatable in the vertical and the traverse direction. Driving an angle-of-visibility changing section 232 formed by a motor or the like allows the unit 22 to rotate in the vertical and traverse directions. This enables pan and tilt operations of the photographing section 21.

The image capturing apparatus 2 has various memories 251 to 253 and a ROM 254 containing programs. A temporary memory 251 is a memory to be used for temporarily storing a frame image captured at the image taking section 21, and an image memory 252 is a memory for recording an image for which a recording instruction is made. In a setting memory 253, various setting information is recorded. The temporary memory 251 is formed by a RAM, and the image memory 252 and the setting memory 253 are formed by, for example, a flash memory. The image memory 252 and the setting memory 253 may be realized by a hard disk.

The image capturing apparatus 2 has a monitor 26, making it possible to display an image captured by the image taking section 21 in real time. Also, it is possible to display an image recorded in the image memory 252, for example. Furthermore, the image capturing apparatus 2 has a communication section 27 and an antenna 28 by way of which wireless communication utilizing a protocol such as bluetooth™ is possible between, for example, operation terminals or the home controller 3.

Figure 4:
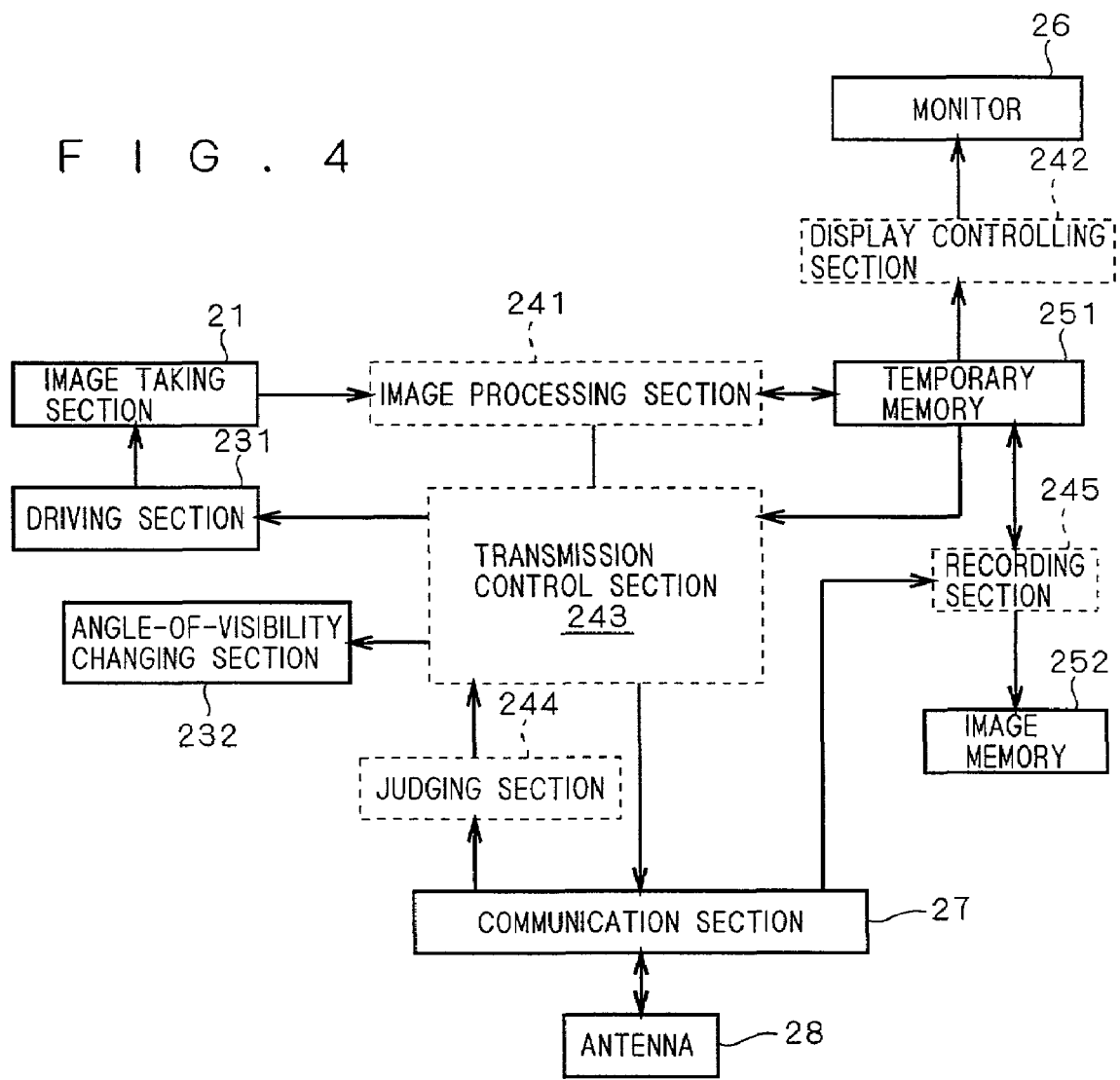
FIG. 4 is a view showing a functional configuration and a flow of data of the image capturing apparatus.

Next, functions realized by executing programs stored in the ROM 254 and flows of respective data will be explained with reference to FIG. 4. In FIG. 4, an image processing section 241, a display controlling section 242, a transmission control section 243 and a judging section 244 and a recording section 245 are functions realized by execution of programs by using hardware sources such as the CPU 24, RAM and the like. It is to be noted that these functions may be fully or partly configured by hardware.

In the image taking section 21, as described above, zooming and focusing operations are performed by the driving section 231, while panning and tilting operations are performed by the angle-of-visibility changing section 232. Then, a captured image is subjected to predetermined image processes such as interpolation and color correction at the image processing section 241 and sequentially stored as a frame image in the temporary memory 251.

At this time, in the case where the image capturing apparatus 2 is used as a normal camera rather than used in a communication mode, the frame image stored in the temporary memory 251 is outputted to the monitor 26 by the display controlling section 242. Thus an operator who uses the image capturing apparatus 2 as a normal camera can use the monitor 26 as a view finder.

In the case where the image capturing apparatus 2 is used in a communication mode, the frame image stored in the temporary memory 251 is transmitted to the operation terminal, the home controller 3 and the like via the communication section 27 and the antenna 28. At this time, the transmitted frame image is controlled at the transmission control section 243 in accordance with the communication form. Explanation on this transmission control will be made later.

The recording section 245 is a functional part which receives a recording instruction command from the operation terminal accepted via the antenna 28 and the communication section 27. Also, upon reception of a recording instruction command, the recording section 245 records the frame image stored in the temporary memory 251, into the image memory 252.

Though the function of the judging section 244 will be described later, the judging section 244 is a functional part which judges a current communication form with the operation terminal, and the transmission control section 243 carries out transmission control based on the judgment of this judging section 244.

<3. Configurations of Home Controller and Operation Terminal>

Next, referring to FIG. 5 to FIG. 8, configurations of the home controller 3 and each operation terminal will be explained.

Figure 5:
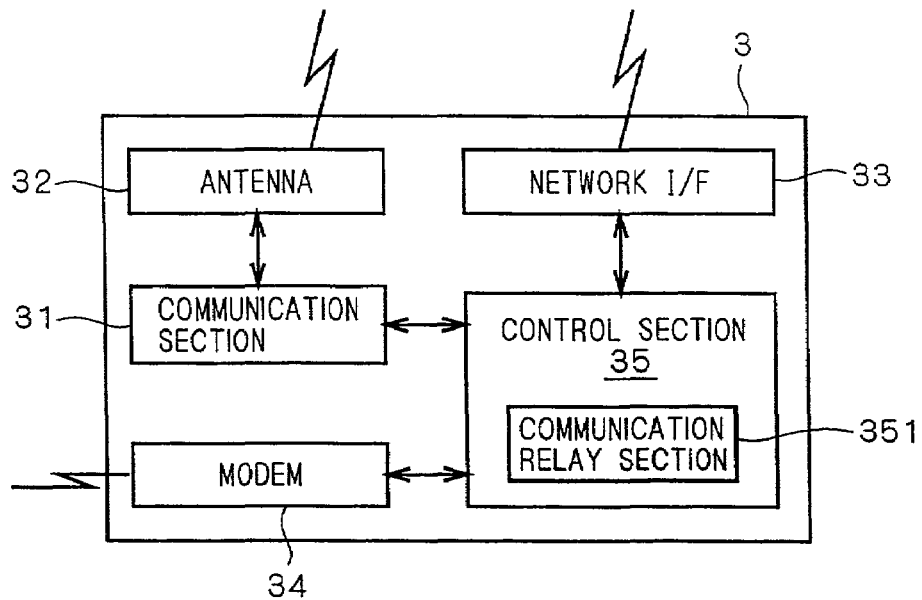
FIG. 5 is a block configuration view of a home controller.

As shown in FIG. 5, the home controller 3 has the communication section 31 and the antenna 32 which allow wireless communication with the image capturing apparatus 2. Further, the home controller 3 has a network I/F 33 which allows connection to the Internet 12. Further, the home controller 3 has a modem 34 which allows communication using the telephone line 11. With such a configuration, the home controller 3 is able to communicate with each operation terminal via the telephone line 11 or the Internet 12.

A control section 35 formed by a CPU, RAM or the like is a center that controls over the home controller 3, and also each communication module is operable under the control of the control section 35.

A communication relay section 351 is a functional part which relays transmission and reception of data between the operation terminal connected via the telephone line 11 or via the Internet 12, and the image capturing apparatus 2 connected via the wireless communication. The communication relay section 351 may be realized by software, or may be fully or partly configured by hardware.

Figure 6:
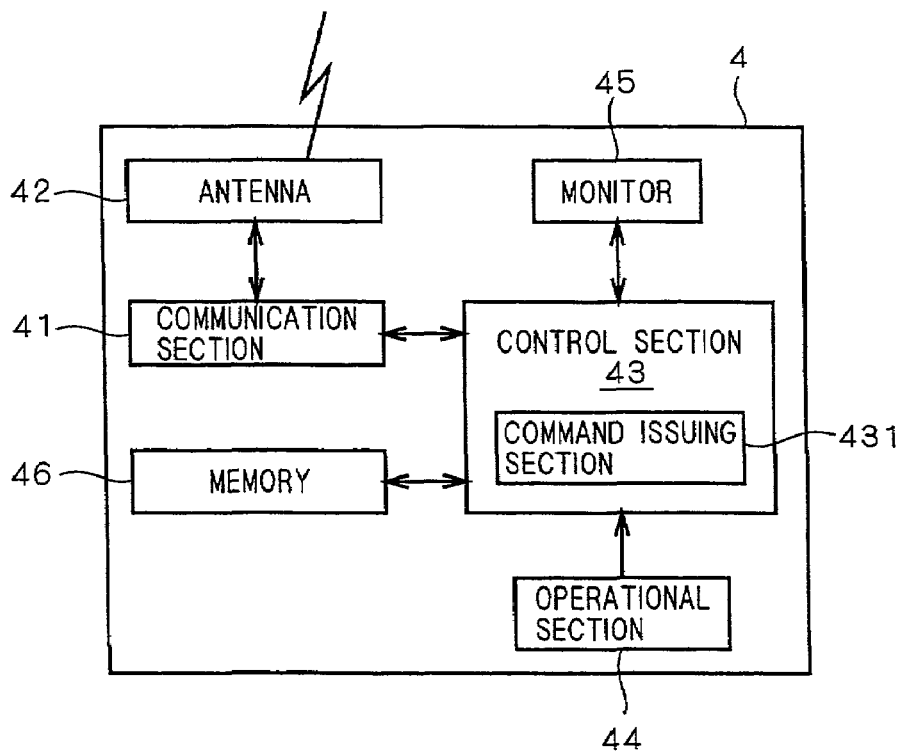
FIG. 6 is a block configuration view of a remote controller.

As shown in FIG. 6, the remote controller 4 has a communication section 41 and an antenna 42 which allow direct wireless communication with the image capturing apparatus 2. The remote controller 4 also has an operational section 44 at which a variety of instruction commands for the image capturing apparatus 2 are inputted, and a monitor 45 for displaying a frame image received from the image capturing apparatus 2. Also, the frame image received from the image capturing apparatus 2 is temporarily stored in the memory 46. An instruction command inputted at the operational section 44 is transmitted to the image capturing apparatus 2 via the communication section 41 and the antenna 42 by a command issuing section 431.

A control section 43 is formed by a CPU, RAM or the like, and is a center that controls over the remote controller 4, and the communication section 41, the operational section 44 and the monitor 45 are operable under the control of the control section 43.

Figure 7:
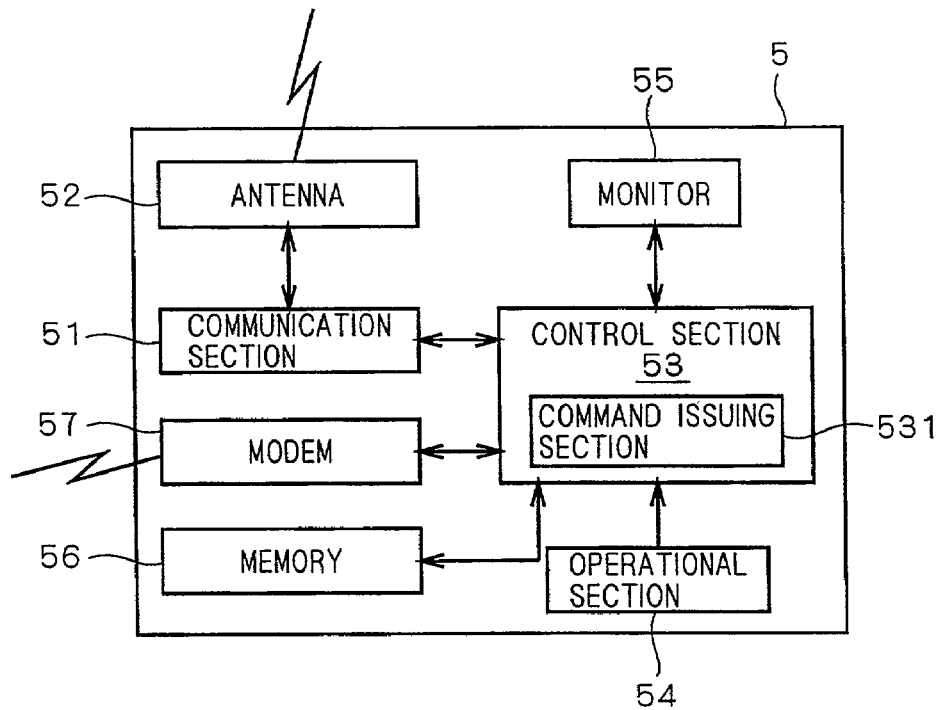
FIG. 7 is a block configuration view of a portable information terminal.

A portable information terminal 5 is substantially the same in configuration as the remote controller 4 except that it has a modem 57, as shown in FIG. 7. More specifically, the portable information terminal 5 has a communication section 51, an antenna 52, a control section 53, a command issuing section 531, an operational section 54, a monitor 55 and a memory 56, thereby allowing direct wireless communication with the image capturing apparatus 2, as well as allowing display of a received frame image on the monitor 55.

Further, the portable information terminal 5 has the modem 57 which allows communication with the home controller 3 via the telephone line 11. As a result, the portable information terminal 5 can communicate with the image capturing apparatus 2 with the use of the telephone line 11 and the wireless communication by passing the home controller 3, and in the same manner, can transmit an instruction command to the image capturing apparatus 2, as well as receiving an image therefrom. Such instruction command and image data are respectively relay-transmitted to the image capturing apparatus 2 and the portable information terminal 5 by means of the communication relay section 351 of the home controller 3.

Figure 8:
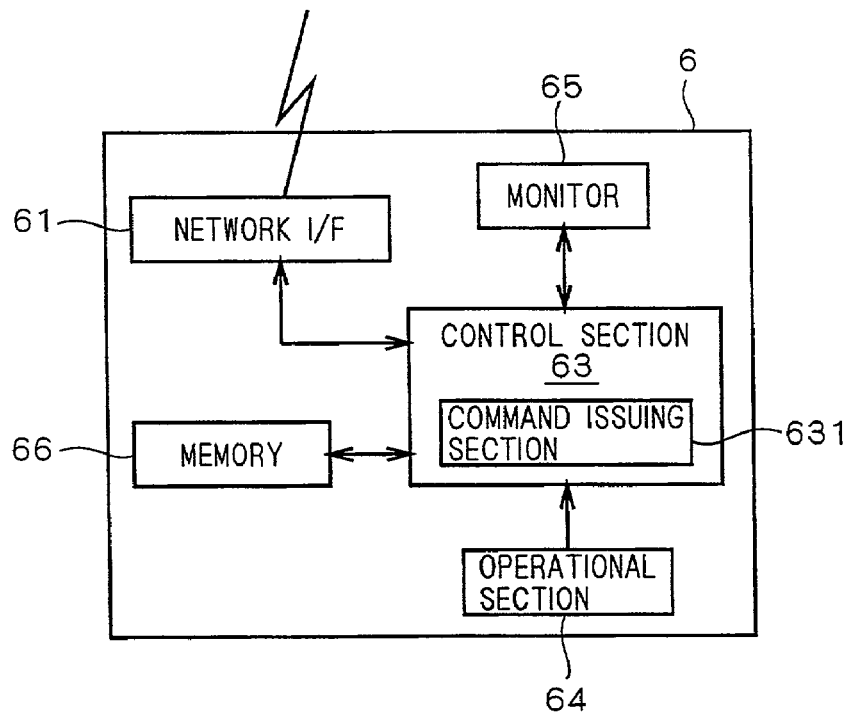
FIG. 8 is a block configuration view of a personal computer.

As shown in FIG. 8, the PC 6 has a network I/F 61 which allows communication with the home controller 3 via the Internet 12. As a result, by passing along the home controller 3, the PC 6 can communicate with the image capturing apparatus 2 with the use of the Internet 12 and the wireless communication.

Further, the PC 6 has an operational section 64 at which a variety of instruction commands for the image capturing apparatus 2 are inputted, and a monitor 65 for displaying a frame image received from the image capturing apparatus 2. Further, a frame image received from the image capturing apparatus 2 is temporarily stored in a memory 66. An instruction command inputted at the operational section 64 is transmitted to the image capturing apparatus 2 from a command issuing section 631 via the network I/F 61.

A control section 63 formed by a CPU, RAM or the like is a center that controls over the PC 6, and the communication section 61, the operational section 64, the monitor 65 and the like are operable under the control of the control section 63.

<4. Transmission Control According to Communication Mode>

Next, explanation will be made on transmission control at the time of transmitting an image to each operation terminal by the functions of judging section 244, the transmission control section 243 and the like as described above.

<4-1. Judgment of Communication Form>

The transmission control section 243 carries out transmission control of image based on the judgment of the judging section 244. Though there is no special limitation for the judging method of communication form by the judging section 244, in the present embodiment, the communication form is judged from a device address and an IP address specifically assigned to each of the operation terminals and the home controller 3.

FIG. 9 is a view showing contents of an address table 70 stored in the setting memory 253 of the image capturing apparatus 2.

"Device address" is an address specifically assigned to each communication module of wireless-communicating terminal, and the image capturing apparatus 2 can acquire a device address of a terminal with which a link is currently established.

Furthermore, in the present embodiment, the communication uses TCP/IP on a wireless communication protocol (bluetooth or the like). Also, the communication using the telephone line 11 uses TCP/IP. Accordingly, any operation terminals and the home controller 3 are assigned with specific IP addresses, so that the image capturing apparatus 2 can acquire from a communication packet an IP address of a terminal with which the image capturing apparatus 2 is communicating.

Therefore, as shown in the drawing, as for the home controller 3, the remote controller 4 and the portable information terminal 5, both of the device address and the IP address are registered in the address table. As for the PC 6 which can communicate with the home controller 3 via the Internet, only the IP address is registered.

The address table 70 also registers information whether or not communication using a telephone line is performed for each operation terminal. In other words, the address table 70 registers information about whether or not a telephone line is included in the communication form when each operation terminal makes a communication via the home controller 3.

Figure 10:
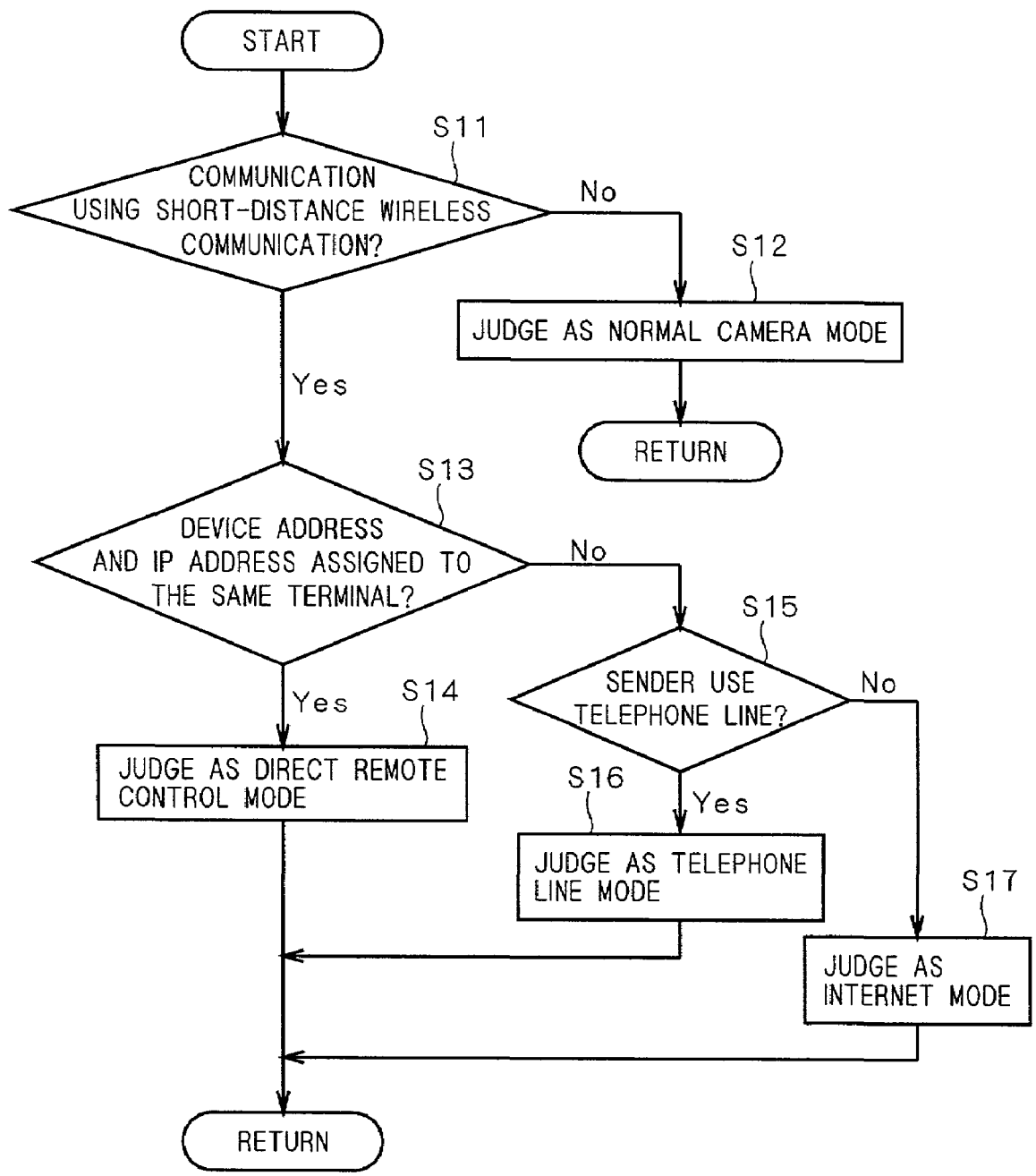
FIG. 10 is a flow chart for a communication form judging process.

A process for judging a communication form with the use of this address table 70 will be explained with reference to the flow chart of FIG. 10.

First, the judging section 244 judges whether or not the image capturing apparatus 2 is establishing radio communication now (step S11). Then, in the case where wireless communication is not being established now (No in step S11), that is, in the case where the image capturing apparatus 2 is used alone without use of communication, it is judged as a normal camera mode (step S12).

In the case where the image capturing apparatus 2 is establishing wireless communication now (Yes in step S11), the judging section 244 acquires a device address of the terminal which establishes the link and an IP address of a communicating end. Then, the judging section 244 determines whether or not the device address and the IP address are assigned to the same terminal according to the address table 70 (step S13). In the case where these addresses are assigned to the same terminal (Yes in step S13), it is judged as a direct remote control mode (step S14). That is, in the case where the acquired device address and IP address are assigned to the same terminal, it can be judged that the operation terminal which is a communicating end is directly wireless-communicating with the image capturing apparatus 2 without passing along the home controller 3.

On the other hand, in the case where the acquired device address and IP address are not assigned to the same terminal (No in step S13), the judging section 244 identifies a communicating end according to the IP address by consulting the address table 70, and then judges whether or not the communicating end is able to communicate using a telephone line (step S15).

Then, in the case where the operation terminal of the communicating end is a terminal which uses a telephone line (Yes in step S15), the judging section 244 judges the current mode as a telephone line mode (step S16). On the other hand, in the case where the operation terminal of the communicating end is not a terminal which uses a telephone line (No in step S15), the judging section 244 determines as an Internet mode (step S17).

In this manner, the judging section 244 makes a judgment whether the mode is direct remote control mode, telephone line mode or Internet mode according to the device address of the terminal with which the like is being established and the IP address of the communicating end.

<4-2. Control of Transmission>

Upon judgment of the communication mode by the judging section 244, an image transmission control by the transmission control section 243 is performed with the use of the judgment. FIG. 11 is a view showing contents of a transmission control table 71 stored in the setting memory 253.

The transmission control section 243 performs a control regarding delay measure, as well as performs a control regarding packet saving.

The control regarding transfer delay is brought into effective in the case where the communication form includes a low-speed communication path, and the present embodiment is so arranged that the control regarding transfer delay is brought into effective in the case of the Internet mode. That is, the judging section 244 judges the current communication form by the afore-mentioned process, and according to judgment result, the communication speed of the current communication form is determined. In other words, the result of judgment by the judging section 244 includes information about communication speed.

It is to be noted that the communication speed depends on not only the transfer rate in each communication line but also on various factors. For example, a transfer delay may occur due to performance of equipment installed on the network, or negotiation with a destination terminal to be connected may consume a time. In the case of a communication form wherein the transfer rate is high but the response is slow, a transfer delay measure for the low-speed communication form should be performed. Therefore, which type of measure should be taken for each communication mode is appropriately determined in the transmission control table 71 while taking various factors regarding the network into consideration.

The delay measure function includes a speed restriction function and a image buffer function. The speed restriction function is a function for restricting speeds of the panning and tilting operations and the zoom operation of the image taking section 21 to not more than maximum speeds. In the case of low communication speed, when a user makes operations such as pan, tilt and zoom at the operation terminal, a problem arises that the camera operates excess to the user's intension since there is a time lag between the image being captured by the image capturing apparatus 2 and the image displayed on the monitor of the operation terminal. For addressing this problem, by decreasing these operation speeds, it is possible to eliminate the inconvenience of operability even when a low-speed communication line is used.

In the case where the communication form includes a low-speed communication line, the transmission control section 243 issues an instruction of speed restriction for the driving section 231 or the angle-of-visibility changing section 232. As a result, the speeds of panning, tilting and zooming operations of the image taking section 21 which is controlled by the angle-of-visibility changing section 232 are decreased.

Next, the image buffer function will be explained. When the image buffer function is brought into active, frame images captured at the image taking section 21 during a predetermined period are stored in the temporary memory 251. For example, frame images captured in recent several seconds are stored in the temporary memory 251. At this time, image capturing time information is recorded in header information of each frame image. Then, the transmission control section 243 converts each frame image into an image of low resolution for transmission to each operation terminal. It is to be noted here that the image capturing time information is recorded also in the head information of the frame image of low resolution to be transmitted. Frame images are stored in the temporary memory 251 at a frame rate of 10 fps (frame per second), and images are transmitted to the operation terminals at a frame rate of 10 fps.

At each operation terminal, frame images of low resolution which are sequentially transmitted are displayed on the monitor for reference by operator and a recording instruction command (release command) is issued in a predetermined timing. A command issuing section of each operation terminal acquires image capturing time information from a frame image of low resolution thus received, and transmits a recording instruction command to the image capturing apparatus 2 together with the image capturing time information.

Upon accepting the recording instruction command at the recording section 245, the image capturing apparatus 2 identifies a frame image which is an object to be recorded from the image capturing time information transmitted together with the recording instruction command, acquires a frame image of high resolution corresponding to the object frame image for storage in the image memory 252. In this manner, since images of low resolution are transmitted to the operation terminals while images of high resolution are accumulated in the temporary memory 251, it is possible to reduce the transmission delay time. Furthermore, by accepting the recording instruction command containing image capturing time information, it becomes possible to record the images of high resolution stored in the temporary memory 251.

By the image buffer function as described above, it is possible to record a still image of high fineness at a moment intended by the user regardless of the communication delay.

Neither the speed restriction function nor the image buffer function is necessary in the case where there is little communication delay, and in other modes than the Internet mode, these functions are deactivated. However, activation/deactivation of the speed restriction function and the image buffer function in the respective communication modes may be optionally selected, and the transmission control table 71 may be changed as necessary.

Control regarding packet saving is activated when the judged communication form includes a communication path wherein a charge is based on the data amount, and in the present embodiment, as shown in FIG. 11, a control regarding packet saving is brought into effective in the Internet mode and the telephone line mode. For example, in the case where an Internet connecting terminal, a portable information terminal and the like employ a system which charges based on the amount of transmitted packet, packet saving is brought into effective for the purpose of reducing the load of expense on the user.

In concrete, packet saving reduces the frame rate of transmitting images, as well as increases a compression rate of a frame image to be transmitted. The transmission control section 243 issues an instruction command to the image taking section 21 to reduce the frame rate of captured image in the case where the communication form is judged as the Internet mode or the telephone line mode. Furthermore, the transmission control section 243 issues an instruction command to the image processing section 241 in order to increase a compression rate of an image to be transmitted to the operation terminal. As shown in the drawing, in the direct remote control mode, the frame rate is 15 fps and the compression rate is $1/10$, while in the Internet mode, the frame rate is reduced to 10 fps and the compression rate is increased to $1/20$. Furthermore, in the telephone line mode, the frame rate is reduced to 5 fps and the compression rate is increased to $1/40$.

In the manner as described above, the transmission control section 243 reduces the number of frames of image transmitted in a certain time and decreases the data size of each image by reducing the frame rate of image transmission to the operation terminal and increasing the compression rate of the image, with the result that it is possible to reduce the packet amount of transmission data. Either one of control of reducing the frame rate or increasing the compression rate may be brought into effective.

In modes other than the normal camera mode, display of the monitor 26 of the image capturing apparatus 2 is not activated. Further, the format of image transmitted in each communication mode is QCIF (quarter CIF) in which emphasis is laid on improvement of the time resolution at the expense of spatial resolution.

As described above, in the present embodiment, in the case where the current communication mode is judged as the Internet mode by the judging section 244, a control regarding delay measure is executed, whereas in the case where the current communication mode is judged as the Internet mode or the telephone line mode by the judging section 244, a control regarding packet saving is automatically executed. Accordingly, the user can acquire a desired image with comfortable operability and without necessity of performing such an operation of changing the setting of communication depending on the type of the communication form.

In the present embodiment, the Internet is described as one example of communication form including a low-speed communication path, however, the delay measure may be executed in the case of using a telephone line. These settings may be made in arbitrary manners with the use of the transmission control table 71. Likewise, in the communication form using the Internet, there is a case that an amount-dependent charge based on the data amount is not employed, and in such a case, packet saving may not be activated in the Internet mode.

<5. Modified Embodiment>

In the above embodiment, the address table 70 contains information about use/nonuse of telephone line, as well as a device address and an IP address.

Figure 13:
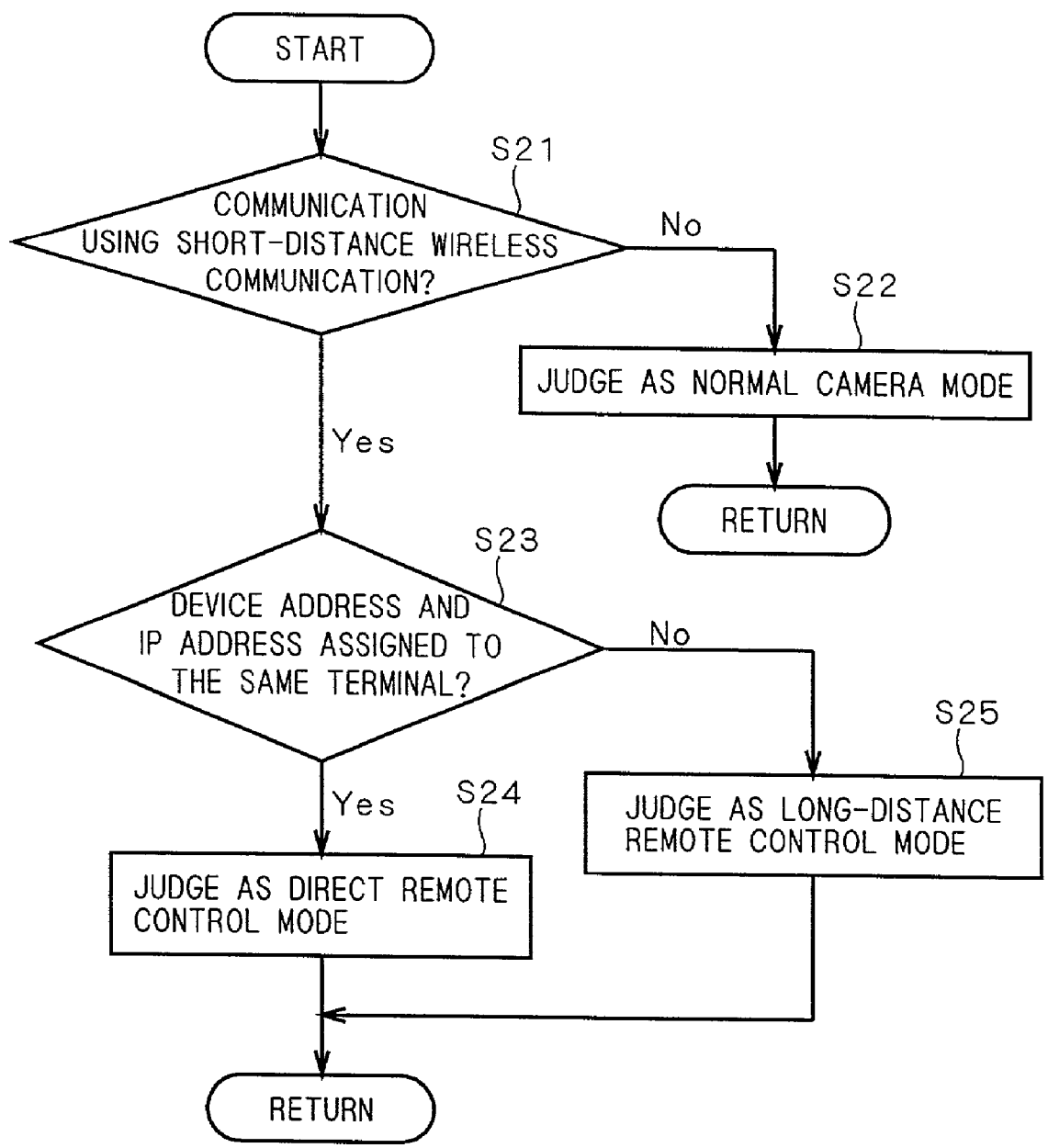
FIG. 13 is a flow chart for a communication form judging process in the modified embodiment.

FIG. 12 is a view showing another embodiment of the address table 70a. The address table 70a does not contain information about use/nonuse of telephone line. Referring to FIG. 13, a judging process of communication mode using the address table 70a will be explained. In another embodiment the address table 70a is substantially the same as that of the foregoing embodiment except for the address table 70a.

The judging section 244 judges whether or not the image capturing apparatus 2 is establishing wireless communication now (step S21). In the case where the image capturing apparatus 2 is not establishing wireless communication, it is judged as the normal camera mode (step S22). In the case where the image capturing apparatus 2 is establishing wireless communication, in accordance with the address table 70, whether or not a device address of a terminal with which a link is being established and an IP address of a communicating end are those of the same terminal is judged (step S23). In the case where the device address and the IP address are those of the same terminal, it is judged as the direct remote control mode (step S24). These processes are as same as those of the forgoing embodiment.

In the case where the device address and the IP address are not those of the same terminal (No in step S23), the judging section 244 judges as a long-distance remote control mode (step S25). Similarly to the above-described embodiment, the judging section 244 discriminates communication forms other than the direct remote control mode as a long-distance remote control mode without judging whether the communication form is the telephone line mode. Then, if it is judged as the long-distance remote control mode, the transmission control section 243 performs both of the control regarding delay measure and the control regarding packet saving. In this manner, it is also possible to simplify the judgment of communication mode.

Furthermore, various other methods are available as the judging method of communication form. For example, a packet transmitted from each operation terminal may include information about which communication form is used. As for a terminal which allows communication forms of two lines such as the portable information terminal 5, by including information about which communication form is being used in a packet, the image capturing apparatus 2 can judge the communication form.

Further, in the foregoing embodiment, a control corresponding to the communication mode is performed in accordance with the setting table shown in FIG. 11, however, the control may be performed in accordance with a setting table as shown in FIG. 14. In the case of a short-distance communication, since an operator is present in the vicinity of the image capturing apparatus, a variety of warning sounds (such as "small battery remaining amount" and "low in exposure") are turned ON. In contrast a to this, in the case of a long-distance communication, since the operator is not present in the vicinity of the image capturing apparatus, such warning sounds are not meaningful, and hence are turned OFF.

An image displayed at an operation terminal is an image of low resolution, and an image of high resolution is recorded in accordance with an instruction for image recording of high resolution that is made while viewing the displayed image. In the present embodiment, the terminal (apparatus) for recording an image of high resolution is switched between the image capturing apparatus or the operation terminal. In the illustrated example, during the short-distance communication, an image of high resolution is recorded at the image capturing apparatus, and during the long-distance communication, an image of high resolution is recorded at the operation terminal. Alternatively, the recording destination may be changed in accordance with the communication form.

While the invention has been shown and described in detail, the foregoing description is in all aspects illustrative and not restrictive. It is therefore understood that numerous modifications and variations can be devised without departing from the scope of the invention.

What is claimed is:

1. An image capturing apparatus for capturing an image of a subject at an image taking section, the apparatus comprising:
- a transmission section for transmitting data of a captured image to an operation terminal via a communication line including at least a public line;
- a judging section for judging a current communication form with said operation terminal;
- a controller for controlling operation of said image capturing apparatus based on a result of judgment by said judging section;
- a temporary memory for temporarily storing frame images captured during a predetermined period of time at said image taking section together with image capturing time information representing the time when each frame image is captured;
- a receiving section for receiving a recording command including said image capturing time information from said operation terminal; and
- an image memory for storing a frame image designated by said recording command in the state of high resolution,
- wherein the result of judgment by said judging section includes information regarding communication speed, and said controller, when said judging section judges that the current communication form includes a low-speed communication path, transmitting frame images whose resolutions have been reduced to said operation terminal together with image capturing time information of each frame image, whereas when it receives said recording command from said receiving section, acquiring a frame image corresponding to said image capturing time information contained in said recording command from the frame images stored in said temporary memory and storing the acquired frame image in the state of high resolution in said image memory.

2. An image capturing apparatus for capturing an image of a subject at an image taking section, the apparatus comprising:
- a transmission section for transmitting data of a captured image to an operation terminal via a communication line including at least a public line;
- a judging section for judging a current communication form with said operation terminal; and
- a controller for controlling operation of said image capturing apparatus based on a result of judgment by said judging section,
- wherein the result of judgment by said judging section includes charge information with respect to use of the communication line, and when said judging section judges that the current communication form is of an amount-dependent charge system based on an amount of transmission data, said controller controls said image taking section so as to reduce a frame rate of a captured image.

3. An image capturing apparatus comprising:
- an image taking section adapted to convert an optical image of a subject into image data;
- a transmission section adapted to transmit image data via at least one of a plurality of communication forms;
- a judging section adapted to determine a current communication form of the at least one of the plurality of communication forms;
- a controller adapted to control operation of said image capturing apparatus based upon the thus determined current communication form;
- a receiving section adapted to receive at least one recording command;
- a temporary memory adapted to temporarily store frame images captured during a predetermined period of time by said image taking section in response to receipt of a first predetermined recording command, said temporary memory also adapted to temporarily store image capturing time information corresponding to a respective frame image; and
- an image memory adapted to store a designated high resolution frame image in response to receipt of a second predetermined recording command,
- wherein, when said judging section determines the current communication form includes a low-speed communication path, said controller causes a resolution reduction in the temporarily stored frame images and causes said transmission section to transmit the thus reduced resolution frame images and the corresponding image capturing time information in response to receipt of the first predetermined recording command, and
- wherein said controller causes said transmission section to transmit the high resolution frame image in response to receipt of the second predetermined recording command.

4. An image capturing apparatus comprising:
- an image taking section adapted to convert an optical image of a subject into image data;
- a transmission section adapted to transmit image data via at least one of a plurality of communication forms;
- a judging section adapted to determine a current communication form of the at least one of the plurality of communication forms; and
- a controller adapted to control operation of said image capturing apparatus based upon the thus determined current communication form;
- wherein when said judging section determines the current communication form is of an amount-dependent charge system based on an amount of transmission data, said controller causes at least one of reducing a frame rate of image data and increasing a compression ratio of image data.

* * * * *